United States Patent

[11] 3,625,426

| [72] | Inventor | Ely Swanson<br>169 Bruce Street, Thornbury, Ontario, Canada |
|---|---|---|
| [21] | Appl. No. | 26,388 |
| [22] | Filed | Apr. 7, 1970 |
| [45] | Patented | Dec. 7, 1971 |

[54] AGRICULTURAL SPRAYING APPARATUS
11 Claims, 4 Drawing Figs.

| [52] | U.S. Cl. | 239/77 |
|---|---|---|
| [51] | Int. Cl. | A01n 17/08 |
| [50] | Field of Search | 239/77, 78 |

[56] References Cited
UNITED STATES PATENTS

| 2,661,239 | 12/1953 | Tirrell | 239/77 |
|---|---|---|---|
| 3,069,091 | 12/1962 | Giesse et al. | 239/77 |
| 3,339,846 | 9/1967 | Guetet | 239/77 X |

*Primary Examiner*—Lloyd L. King
*Attorney*—Rogers, Bereskin & Parr

ABSTRACT: Agricultural spraying apparatus including a fan which inspires air axially and expels the air together with a liquid spray radially. The fan includes an impeller having a longitudinal extent substantially less than that of a fan casing so that as the impeller compresses air, the pressures in the air tend to equalize in the space between the fan and the casing before the air is displaced through the outlet. To facilitate assembly, contoured surfaces on the impeller and casing are engaged to locate the ring in relation to the impeller.

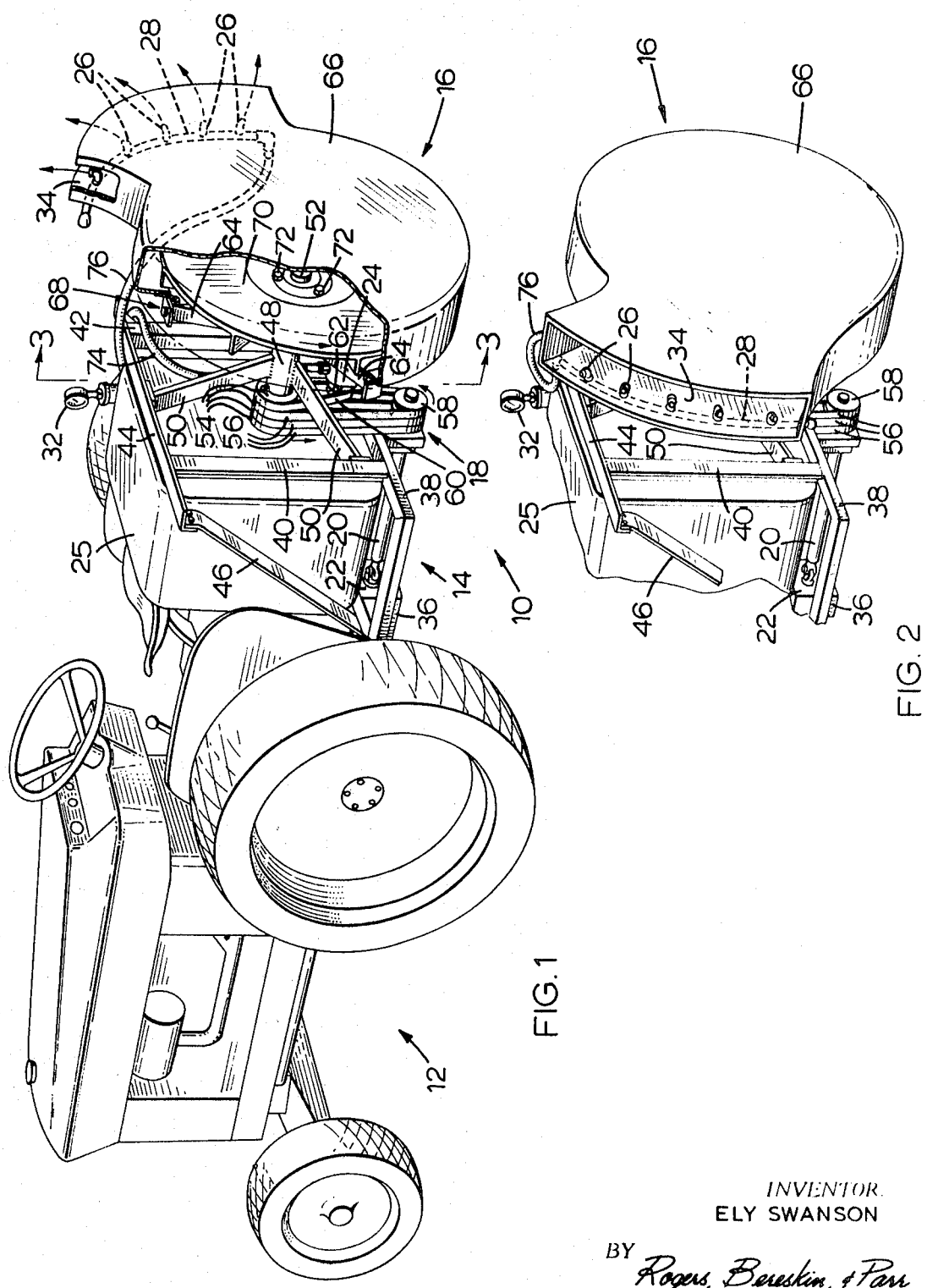

INVENTOR.
ELY SWANSON

AGRICULTURAL SPRAYING APPARATUS

This application relates to agricultural apparatus for spraying crops including fruit trees.

Crops and fruit trees have been sprayed from a moving vehicle by pumping spraying liquid through nozzles into a stream of high volume low pressure air which was directed towards the crop. This method of spraying produced relatively large droplets of spraying liquid which tended to run off the crop. It has been found that spraying can be done more effectively and more economically by blowing a relatively low volume low-pressure air past a set of nozzles which direct pressurized liquid spray into the air stream. A relatively fine spray results which clings to the crop resulting in less runoff and thereby reducing the amount of liquid used when spraying a given area of crop. Also, because the volume of air is reduced, the power required to drive a fan for forcing the air past the nozzles is also reduced, thereby providing a saving in fuel costs. However, although apparatus has been built which can develop the necessary high air pressures, it is relatively expensive and tends to provide uneven pressure distribution at the nozzles resulting in an uneven spray distribution.

It is therefore an object of the present invention to provide a relatively inexpensive apparatus for discharging a relatively high pressure low volume air stream past a row of nozzles such that the pressure in the airstream is substantially constant.

It is also an object of the present invention to provide an fan for an agricultural apparatus which is relatively inexpensive to manufacture and assemble.

Accordingly, in one of its aspects, the invention provides an apparatus which includes a fan attached to a support structure. The fan includes an impeller having ogee blades and contained in an involute casing. Air is inspired axially through an opening or eye in the casing and ejected through a radial outlet at the periphery of the casing. The longitudinal extent or width of the casing is substantially larger than that of the impeller so that as the impeller expels air radially, the pressures in the air tend to equalize in the axial space between the impeller and the casing before the air is displaced past the nozzles and out through the outlet.

According to another aspect of the invention an agricultural spraying apparatus is provided having a fan and a support structure. The fan and support structure are arranged to simplify assembly of the apparatus and the fan includes an impeller mounted for rotation about a longitudinal axis, and an involute fan casing. The casing has a ring which has contoured surfaces adapted to engage with similarly contoured surfaces on the impeller. Once the impeller is mounted on the support structure, the contoured surfaces are engaged to locate the ring in relation to the impeller and hence to the longitudinal axis. The ring can then be attached to the support structure, and the impeller backed off from the ring by a requisite amount to thereby ensure proper location of the ring and the casing about the longitudinal axis.

In drawings which illustrate a preferred embodiment of the invention;

FIG. 1 is a perspective partially sectioned view of spraying apparatus coupled to a conventional tractor;

FIG. 2 is a view similar to FIG. 1 showing a part of the spraying apparatus in another position;

Figure 4:
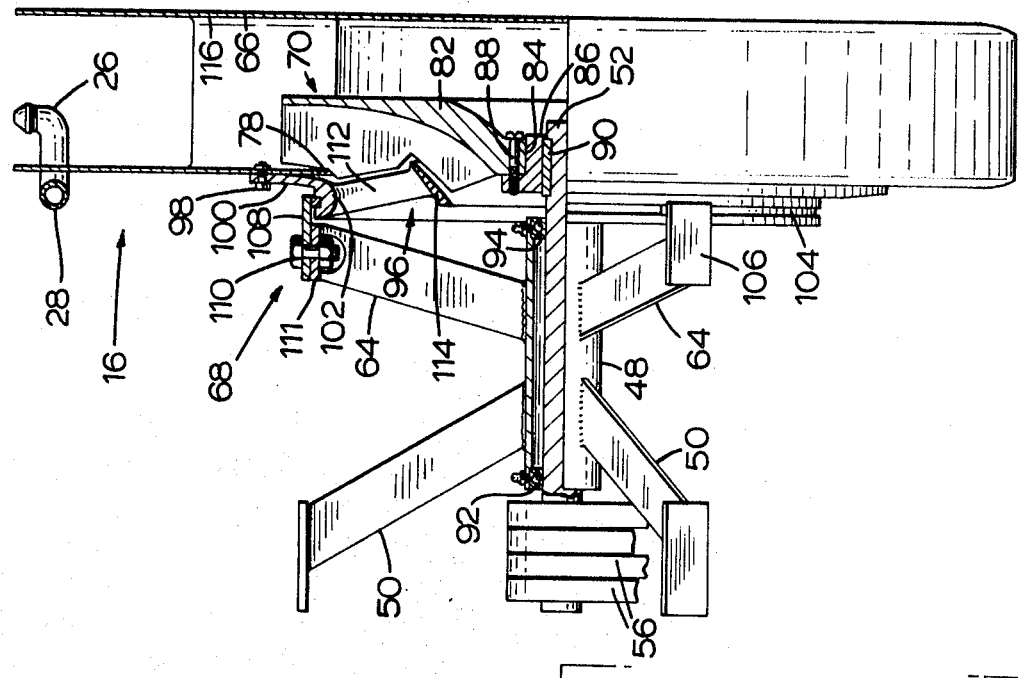
FIG. 4 is a sectional view on lines 4—4 of FIG. 3.

Reference is first made to FIG. 1 which shows a spraying apparatus 10 attached to a tractor 12 behind the driver's seat. The spraying apparatus comprises a support structure 14 for attachment to the back of a tractor 12, and a fan 16 which is attached to the rear of the support structure 14. The fan is rotatably driven through a drive train 18 from a drive shaft 20 coupled to a conventional tractor power takeoff 22. Drive train 18 also drives a pump 24 which receives pressurized liquid insecticide or the like from a tank 25 and pumps it to nozzles 26 attached to a manifold 28. Fan 16 is adjustably attached to the support structure 14 for movement about its longitudinal axis so that a fan outlet 34 can be directed to either side of the tractor as illustrated in FIGS. 1 and 2.

The support structure 14 is bolted to a conventional implement support frame 36 on the tractor 12 and includes a lower horizontal rectangular frame 38, the rear of which is attached to the lower ends of two spaced-apart uprights 40,42. The uprights are attached by their upper ends to a transversely extending horizontal member 44 intermediate its ends, and one of a pair of ties 46 (one of which is shown) extends downwardly and forwardly from each end of the member 44 to the front of the horizontal frame 38 to rigidify the support structure 14. A cylindrical bearing housing 48 extends longitudinally of the apparatus 10 and is rigidly attached to the support structure 14 by three front radial members 50, a first of which extends upwardly to terminate at the underside of the upper horizontal member 44, and the second and third of which extend generally downwardly and forwardly to inner sides of respective uprights 40. The bearing housing 48 rotatably journals a fan shaft 52 on which the fan 16 is mounted. Four upper pulley wheels 54 are keyed to shaft 52 and three of the pulleys cooperate with V-belts 56 and corresponding lower pulleys 58 to drive the shaft 52 from the drive shaft 20. The fourth and rearmost upper pulley is coupled by a V-belt 60 to a pulley 62 for driving the pump 24 which is attached to one of three rear radial members 64 (two of which can be seen in this figure). The members 64 are attached to the bearing housing and extend radially and slightly rearwardly to support a fan involute casing 66 to which is attached the manifold 28 and nozzles 26 adjacent the outlet 34. The rear radial members 64 correspond in angular position with the front radial members 50. A first of the rear members 64 extends upwardly and terminates in a clamp 68 to releasably attach the casing 66 for adjustment between the positions shown in FIGS. 1 and 2. (This adjustment and the clamp 68 will be more fully explained with reference to FIG. 4). A fan impeller 70 is attached to the shaft 52 by tightening three bolts 72 (two of which are seen) as will be described.

Spraying liquid is drawn from the tank 25 by the pump 24 which forces the liquid through delivery pipes 74, 76 past a pressure gauge 32 and other conventional devices (not shown) which control the pressure and delivery of the liquid at the nozzles 26.

Figure 3:
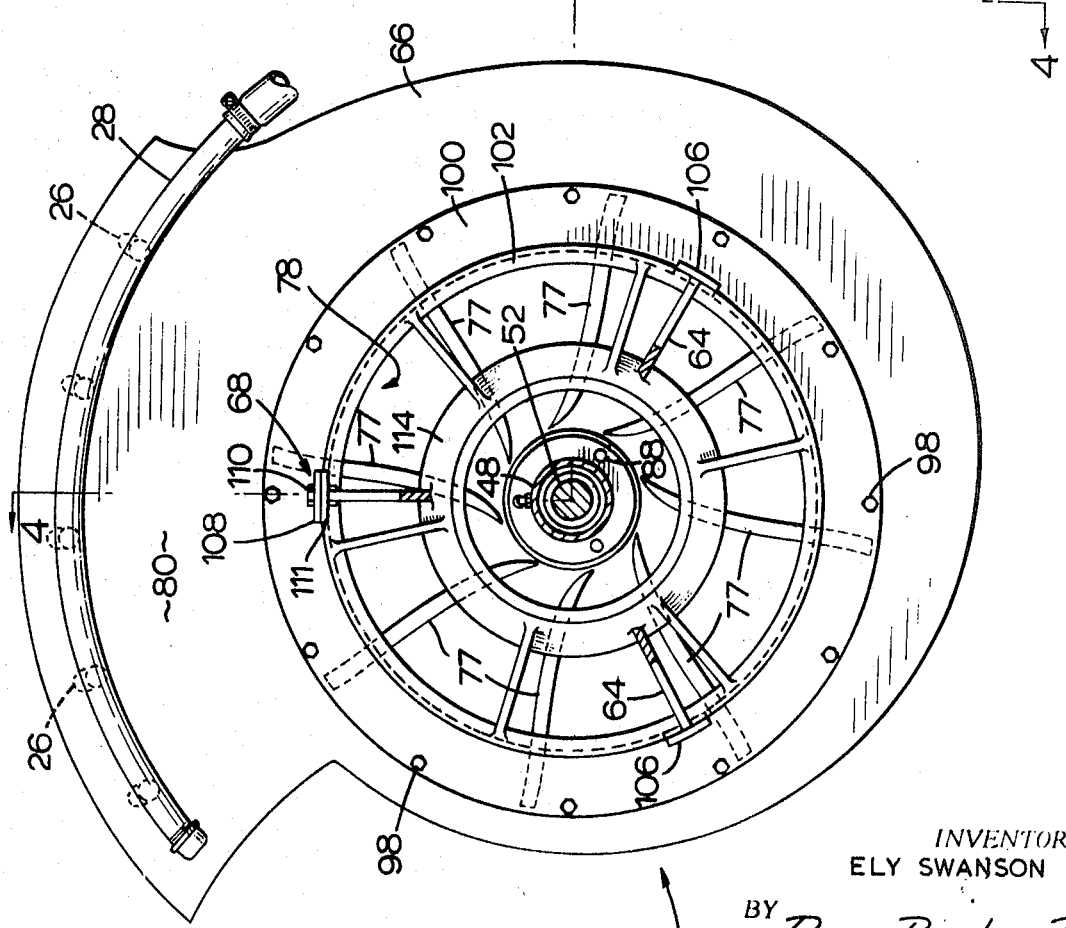
FIG. 3 is a sectional view on lines 3—3 of FIG. 1.

Next, reference is made to FIGS. 3 and 4 with particular reference to FIG. 4 to describe the fan 16 in detail. The fan impeller 70 has eight ogee blades 77 extending substantially radially of the longitudinal axis of the fan 16. Any suitable number of blades can be used. The blades are arranged to inspire air from a forwardly facing central axial inlet opening or eye 78 in the front wall 80 of the casing 66. The blades 77 extend forwardly and axially from an integral contoured flange 82 which guides the air from the inlet 78 so that the blades 77 combine with the flange 82 to direct the air substantially radially from the impeller 70. The flange 82 is substantially concentric about a central axial opening 84 which is slightly tapered to converge rearwardly of the impeller. The opening is adapted to fit closely on a split-tapered bush 86 having a radial flange at its forward end for receiving bolts 88 which are fitted in the flange 82. A key 90 in the shaft 52 combines with the bush 86 to prevent rotation of the bush and hence of the impeller 70 about the shaft 52. The split-tapered bush is dimensioned such that it can be relatively easily pushed onto the shaft 52 and key 90, and so that when the impeller 70 is drawn onto the bush, the split in the bush closes and the bush is locked to the shaft 52. This arrangement simplifies assembly of the apparatus as will be described.

The shaft 52 is located axially for rotation by deep-groove ball bearings 92, 94 each of which is a forced fit on the shaft 52 and is located at a respective end of the bearing housing 48. The casing 66 is attached to an air guide ring 96 by bolts 98 passing through the front wall 80 of the casing 66 and through an outer flange portion 100 of the ring. The portion 100 extends outwardly from the rear of a generally cylindrical portion 102 which is rounded on its inner face for smoother passage of air into the fan. The outer face of the portion 102 has an annular groove 104 for receiving ends of fingers 106 downwardly extending rear radial members 64, and an adjustable finger 108 which forms part of a clamp 68. The finger 108 is coupled by a bolt 110 to a pad 111 on the outer end of the arm 64 so that when the bolt 110 is tightened, the fingers 106, 108 are in frictional engagement with the groove 104 and the fan casing 66 is fixed relative to the support structure 14. Upon releasing the bolt 110, the fan casings can be rotated and the finers 106, 108 slide in the groove 104 to allow the fan to take up the position shown in FIG. 2. The bolt 110 can then be retightened to lock the fan in its new position.

The ring 96 also includes six radial arms 112 which extend inwardly from the cylindrical portion 102 to support an annular generally cylindrical portion 114 for guiding air into the impeller 70. The conical portion 114 is shaped to improve flow of air into the impeller, and to cause compression of the air as it moves into the impeller.

As best seen in FIG. 4, the forward end faces of the blades 77 of the impeller 70 and the rear end faces of the ring 96 are machined so that on assembly there is a small gap between these faces sufficient only to permit the impeller to rotate without interference with the ring 96. The machining of these faces permits a simple assembly procedure to be followed as will now be described.

The front faces of the impeller 70 are machined with reference to the opening 84 which receives the split-tapered bush 86. To assemble the apparatus, the bearing housing 48 is first attached to the forward radial members 50 and to the rear radial members 64 without the fingers 106 and pad 111. Next, the shaft 52 is positioned in bearings 92, 94 in the housing 48 and the ring 96 is passed over the rear end of the shaft 25 before positioning bush 86 approximately on the shaft 52. Then the impeller 70 is placed on the bush and tightened just sufficiently to locate it concentrically on the bush 86 and shaft 52. Ring 96 is then moved into contact with the impeller, and because the contacting surfaces are machined for registration one with the other, this movement locates the ring 96 concentrically about the longitudinal axis of shaft 52. Fingers 106 and clamp 68 are next positioned on their respective members 64 with a thin shim between the fingers 108 and the pad 111 before welding pad 111 and fingers 106 to their respective members. This method of assembly locates the ring 96 and once the shim is removed, the clamp can be tightened to lock the ring in place on the members 64. The assembly is completed by attaching the casing 66 to ring 96 by using bolts 98 and moving the impeller 70 away from the ring 96 by loosening the bolts 88 and pulling the impeller rearwardly. The impeller is then repositioned and the bolts tightened such that there is a small running clearance between the impeller and the ring 96. This assembly procedure considerably reduces the expense commonly incurred in machining fan casings to give the necessary clearance between the casing nd the impeller and to facilitate accurate assembly.

As seen in FIG. 4, the axial clearance between the impeller 70 and a rear inner wall 116 of the casing 66 is relatively large. This clearance provides a space in which pressures in the air from the impeller 70 tend to equalize before the air is displaced out through the outlet 34. This equalization of air pressures results in more even pressure distribution over the nozzles 26 thereby improving the quality of the spray because the liquid from the nozzles is carried relatively uniformly by the air from the fan.

In a typical fan, the impeller was 21 inches in diameter and 5 inches in axial width and was driven at 1,800 revolutions per minute giving an air outlet velocity of about 100 miles per hour. The casing had a 5 inch axial space for the impeller.

Some tractors have been developed with power takeoffs capable of about 2,000 revolutions per minute and these takeoffs can be coupled directly to the fan with suitable modifications to the liquid tank and to the support structure.

The embodiment of the invention in which an exclusive property or privilege is claimed are defined as follows:

1. Agricultural spraying apparatus for directing a liquid spray on to a crop, fruit trees or the like, said apparatus being disposed about a longitudinal axis and comprising:

a. a fan mounted transversely of said axis, and comprising:

i. an involute fan casing having front and rear substantially transverse walls, one of said walls having an axial air inlet opening and said casing having a generally radial air outlet for directing air from said fan transversely of said axis: and ii. an impeller for rotation in said casing about said axis adjacent said inlet to draw air from said inlet and expel air radially through said outlet, said impeller comprising a plurality of ogee blades and a radial flange, said blades being connected to said flange and extending substantially axially from said flange toward said one of said walls, and having an axial extent substantially less than the axial distance between said walls so that there is a substantial space between said impeller and the other of said walls, whereby when said air leaves said impeller different pressures in said air tend to equalize in said space before said air is displaced though said outlet;

b. a support structure adapted to be connected to a vehicle;

c. means connecting as impeller to said support structure for axial location of said impeller and for rotation of said impeller about said longitudinal axis;

d. means coupling said casing to said support structure whereby said casing is located longitudinally relative to said impeller with said impeller adjacent said one of said walls;

e. means for spraying pressurized liquid into said air as said air passes through said outlet whereby said liquid spray is carried by said air; and f. means for connecting said impeller and said spraying means to a drive means for rotating said impeller and for pressurizing said liquid.

2. Agricultural spraying apparatus as claimed in claim 1 wherein said casing coupling means is adjustable for rotating said casing about said longitudinal axis to direct said outlet in any desired transverse direction.

3. Agricultural spraying apparatus as claimed in claim 2 wherein said support structure comprises: a longitudinally extending bearing housing; a shaft extending through said housing and bearing means coupled to said bearing housing for axially locating and mounting said shaft for rotation about said axis, and including impeller mounting means whereby said impeller is attached to a rear end of said shaft for rotation about said axis.

4. Agricultural spraying apparatus as claimed in claim 3 wherein said impeller mounting means comprises; a taper split bush adapted to slidably engage on said shaft and further adapted to engage in a tapered axial opening on said impeller; and means for drawing said impeller onto said bush whereby said bush grips said shaft and thereby axially locates said impeller and said bush on said shaft.

5. Agricultural spraying apparatus as claimed in claim 4 wherein said casing coupling means further comprises: a ring having a generally cylindrical portion concentric with said shaft and a radial flange extending outwardly from the rear of said cylindrical portion including an annular groove for adjustable connection to said support structure; and means attaching said flange to said front wall of said casing: and wherein said support structure includes three radially spaced fingers coupled to said bearing housing for engaging in said groove, at least one of said fingers being adjustable for clamping said casing with said outlet in said desired transverse direction.

6. Agricultural spraying apparatus as claimed in claim 5 wherein said spray means comprises: a storage tank for containing spraying liquid; pump means for pumping said liquid; and nozzles attached to said casing inside said outlet for spraying said liquid into air leaving said casing through said outlet; and flexible hose means coupling said tank, said pump and said nozzles such that upon operation of said pump said liquid is moved from said tank to said nozzles and sprayed from said nozzles.

7. Agricultural spraying apparatus for directing a liquid spray on to a crop, fruit trees or the like, said apparatus being disposed about a longitudinal axis and comprising:

a. a fan mounted transversely of said axis and comprising:
  i. an involute fan casing having front and rear transverse walls, said front wall having an axial air inlet opening and said casing having a radial air outlet for directing air from said fan transversely of said axis;
  ii. a ring having a generally cylindrical portion disposed concentrically about said axis and a radial flange extending outwardly from the rear of said cylindrical portion, said cylindrical portion including an annular groove for adjustably mounting said housing for rotation about said axis to position said outlet for controlling the direction of said spray;
  iii. means attaching the flange of said ring to said front wall of said casing; and
  iv. an impeller for rotation in said casing about said axis to draw air from said inlet and expel air radially through said outlet, said impeller comprising a plurality of ogee blades and a radial impeller flange, said blades being connected to said impeller flange and extending substantially axially from said impeller flange toward said wall;
b. a support structure adapted to be connected to a vehicle, and comprising:
  i. a longitudinally extending bearing housing; a shaft extending through said housing; and bearing means coupled to said bearing housing for axially locating and mounting said shaft for rotation about said axis, and including mounting means whereby said impeller is attached to a rear end of said shaft for rotation about said axis;
c. means coupling said ring to support structure whereby said ring and said casing are located longitudinally relative to said impeller, said ring and said impeller having respective rear and forward faces adapted to engage for locating the ring relative to the impeller during assembly whereby said ring may be positioned in relation to said impeller for attaching said coupling means to said ring and to said bearing housing with proper concentric and axial alignment of said ring in relation to said axis;
d. means for spraying pressurized liquid into said air as said air passes through said outlet whereby said liquid spray is carried by said air; and
e. means for connecting said shaft and said spraying means to a drive for rotating said shaft and for pressurizing said liquid.

8. Agricultural spraying apparatus as claimed in claim 7 wherein said impeller mounting means comprises: a taper split bush adapted to slidably engage on said shaft and further adapted to engage in a tapered axial opening on said impeller; and means for drawing said impeller onto said bush whereby said bush grips said shaft and thereby axially locates said impeller and said bush on said shaft.

9. Agricultural spraying apparatus as claimed in claim 8 wherein said impeller has an axial extent substantially less than the axial distance between said walls so that there is a substantial space between said impeller and the other of said walls, whereby when said air leaves said impeller different pressures in said air tend to equalize in said space before said air is displaced through said outlet;

10. Agricultural spraying apparatus as claimed in claim 9 wherein said spray means comprises: a storage tank for containing spraying liquid; pump means for pumping said liquid; and nozzles attached to said casing inside said outlet for spraying said liquid into air leaving said casing through said outlet; and flexible hose means coupling said tank, said pump and said nozzles such that upon operation of said pump said liquid is moved from said tank to said nozzles and sprayed from said nozzles.

11. Agricultural spraying apparatus as claimed in claim 10 wherein said casing coupling means is adjustable for rotating said casing about said longitudinal axis to direct said spray in any desired transverse direction.

* * * * *